(12) United States Patent
Lloyd et al.

(10) Patent No.: US 10,210,267 B1
(45) Date of Patent: *Feb. 19, 2019

(54) DISAMBIGUATION OF A SPOKEN QUERY TERM

(71) Applicant: Google LLC, Mountain View, CA (US)

(72) Inventors: Matthew I. Lloyd, Cambridge, MA (US); Johan Schalkwyk, Scarsdale, NY (US); Pankaj Risbood, Bangalore (IN)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/233,141

(22) Filed: Aug. 10, 2016

Related U.S. Application Data

(63) Continuation of application No. 13/958,740, filed on Aug. 5, 2013, now Pat. No. 9,418,177, which is a continuation of application No. 12/845,034, filed on Jul. 28, 2010, now Pat. No. 8,521,526.

(51) Int. Cl.
| | |
|---|---|
| *G10L 15/22* | (2006.01) |
| *G06F 17/30* | (2006.01) |
| *G10L 15/183* | (2013.01) |
| *G10L 15/01* | (2013.01) |

(52) U.S. Cl.
CPC .. *G06F 17/30867* (2013.01); *G06F 17/30684* (2013.01); *G10L 15/01* (2013.01); *G10L 15/183* (2013.01)

(58) Field of Classification Search
USPC ................................. 704/246, 247, 251, 252
See application file for complete search history.

(56) References Cited

U.S. PATENT DOCUMENTS

| | | | |
|---|---|---|---|
| 6,839,669 B1 * | 1/2005 | Gould | ..................... G10L 15/22 704/246 |
| 8,265,928 B2 | 9/2012 | Kristjansson et al. | |
| 8,412,727 B1 | 4/2013 | Das et al. | |
| 8,452,763 B1 | 5/2013 | Pasca | |
| 8,826,511 B2 | 9/2014 | Barnes et al. | |

(Continued)

OTHER PUBLICATIONS

Notice of Allowance issued in U.S. Appl. No. 12/845,034 dated May 23, 2013, 12 pages.

(Continued)

*Primary Examiner* — Leonard Saint Cyr
(74) *Attorney, Agent, or Firm* — Fish & Richardson P.C.

(57) ABSTRACT

Methods, systems, and apparatus, including computer programs encoded on a computer storage medium, for processing spoken query terms. In one aspect, a method includes performing speech recognition on an audio signal to select two or more textual, candidate transcriptions that match a spoken query term, and to establish a speech recognition confidence value for each candidate transcription, obtaining a search history for a user who spoke the spoken query term, where the search history references one or more past search queries that have been submitted by the user, generating one or more n-grams from each candidate transcription, where each n-gram is a subsequence of n phonemes, syllables, letters, characters, words or terms from a respective candidate transcription, and determining, for each n-gram, a frequency with which the n-gram occurs in the past search queries, and a weighting value that is based on the respective frequency.

24 Claims, 6 Drawing Sheets

(56) References Cited

U.S. PATENT DOCUMENTS

| | | | |
|---|---|---|---|
| 8,983,845 B1 | 3/2015 | Kristjansson et al. | |
| 2006/0004850 A1 | 1/2006 | Chowdhury | |
| 2007/0106508 A1* | 5/2007 | Kahn | G10L 15/22 704/235 |
| 2008/0118051 A1* | 5/2008 | Odinak | H04W 4/12 379/265.09 |
| 2008/0228484 A1* | 9/2008 | Gao | G06F 17/2827 704/251 |
| 2009/0150322 A1 | 6/2009 | Bower et al. | |
| 2009/0210226 A1 | 8/2009 | Ma | |
| 2009/0228274 A1* | 9/2009 | Terrell, II | G10L 15/22 704/235 |
| 2010/0049500 A1* | 2/2010 | Kobayashi | G06F 17/2755 704/9 |
| 2010/0228540 A1 | 9/2010 | Bennett | |
| 2011/0257974 A1 | 10/2011 | Kristjansson et al. | |
| 2011/0295590 A1 | 12/2011 | Lloyd et al. | |
| 2011/0307253 A1 | 12/2011 | Lloyd et al. | |

OTHER PUBLICATIONS

Office Action issued in U.S. Appl. No. 13/958,740 dated Apr. 6, 2015, 15 pages.
Office Action issued in U.S. Appl. No. 13/958,740 dated Sep. 3, 2015, 12 pages.
Office Action issued in U.S. Appl. No. 13/958,740 dated Dec. 23, 2015, 13 pages.
Notice of Allowance issued in U.S. Appl. No. 13/958,740 dated Apr. 11, 2016, 7 pages.

* cited by examiner

US 10,210,267 B1

DISAMBIGUATION OF A SPOKEN QUERY TERM

CROSS-REFERENCE TO RELATED APPLICATION

This application is a continuation of U.S. application Ser. No. 13/958,740, filed Aug. 5, 2013, which is a continuation of U.S. application Ser. No. 12/845,034, filed Jul. 28, 2010, the contents both are incorporated by reference.

BACKGROUND

This specification relates to search engines.

As the amount of information available on the Internet has dramatically expanded, users have had an increasingly difficult time formulating effective search queries for locating specific, relevant information. In recent years, competition among search engine providers has caused an explosive acceleration in the evolution of search engine algorithms, as well as in the user interfaces that are used to receive queries and display search results.

Various mechanisms can be used to provide queries to a search engine. For example, a user may type a query term into a search box using a keyboard on a computing device, and may then submit the query terms to a search engine. A user may implicitly define a query by panning around a map in order to obtain annotations for points of interest that exist on the displayed portion of the map. In addition, users may speak query terms when using mobile devices (e.g., smartphones, music players, or tablet computers) that either have a small keyboard, or that do not have a keyboard.

SUMMARY

One innovative aspect of the subject matter described in this specification is embodied in methods that include the action of using a user's search history to select a match for a query term that the user has spoken, when a speech recognition engine generates several possible matches for the spoken query term. In one example, a user speaks a query term with the sounds "kɑ: bil" (represented using International Phonetic Alphabet (IPA) phonetic notation) into the microphone of a mobile device. Because users have a tendency to repeat search queries over time, the speech recognition engine can use the user's search history to determine whether intended to speak the query terms "call bill," "call Phil," "cobble," "cable," "kill bill," "call bull," "Kabul," or other similar-sounding terms, based on whether the user has searched for these query terms in the past. In doing so, the user's search history is used to improve the accuracy of the speech recognition.

Other information, such as the context of the spoken query term and the contexts associated with the past search queries can also be used to assist in the selection of the match. For instance, a particular match may be selected if the user has submitted a similar search query at a similar time of day or on the same day of the week, in the past. Other embodiments of this aspect include corresponding systems, apparatus, and computer programs, configured to perform the actions of the methods, encoded on computer storage devices.

As used by this specification, the word "term" (or phrase "query term") refers to one or more whole or partial words, characters, or strings of characters, and the term "search query" is used to refer to the one or more query terms that the user submits to a search engine when the user requests the search engine to perform or execute a search. Among other things, a "result" (or a "search result") of the search includes a Uniform Resource Identifier (URI) that identifies a resource that the search engine determines to be responsive to the search query. The search result may include other things, such as a title, preview image, user rating, map or directions, description of the corresponding resource, or a snippet of text that has been automatically or manually extracted from, or otherwise associated with, the corresponding resource.

In general, another aspect of the subject matter described in this specification may be embodied in methods that include the actions of receiving an audio signal that corresponds to a spoken query term, performing speech recognition on the audio signal to select two or more textual, candidate transcriptions that match the spoken query term, and to establish a speech recognition confidence value for each candidate transcription, obtaining a search history for a user who spoke the spoken query term, where the search history references one or more past search queries that have been submitted by the user, generating one or more n-grams from each candidate transcription, where each n-gram is a subsequence of n phonemes, syllables, letters, characters, words or terms from a respective candidate transcription, determining, for each n-gram, a frequency with which the n-gram occurs in the past search queries, and a weighting value that is based on the respective frequency, generating, for each of the candidate transcriptions, a combined value based on combining the speech recognition confidence value for the candidate transcription with the weighting value for one or more of the n-grams that are generated from the candidate transcription, selecting an intended query term from among the candidate transcriptions based on the combined values, and causing a search engine to perform a search query that includes the intended query term.

Other embodiments of these aspects include corresponding systems, apparatus, and computer programs, configured to perform the actions of the methods, encoded on computer storage devices.

These and other embodiments may each optionally include one or more of the following features. For instance, the actions include determining a context associated with the spoken query term, and selecting a subset of the past search queries that include contexts which are similar to the context of the spoken query term, where determining, for each n-gram, a frequency with which the n-gram occurs in the past search queries further includes determining, for each n-gram, a frequency with which the n-gram occurs in the past search queries that are members of the subset only. Determining a context associated with the spoken query term further includes determining a date that the spoken query term was spoken by the user, and selecting a subset of the past search queries that include contexts which are similar to the context of the spoken query term further includes selecting a subset of the past search queries that were submitted by the user on the same date, that were submitted within a predetermined time period before the date, that were submitted on a same day of the week as the date, that were submitted on the same day, week, month or year as the date, that were submitted on a weekend when the date occurs on a weekend, or that were submitted on a weekday when the date occurs on a weekday. Determining a context associated with the spoken query term further includes determining a time that the spoken query term was spoken by the user, and selecting a subset of the past search queries that include contexts which are similar to the context of the spoken query term further includes selecting a subset of the past search queries that were submitted by the user within a predetermined amount of period before the time, that were submitted on a same time of day as the time, that were submitted on a same minute or hour as the time, that were submitted on during daytime when the time occurs during daytime, or that were submitted during nighttime when the time occurs during nighttime. Determining a context associated with the spoken query term further includes determining that a device used by the user to enter the spoken query term was docked or holstered when the user spoke the spoken query terms, and selecting a subset of the past search queries that include contexts which are similar to the context of the spoken query term further includes selecting a subset of the past search queries that were submitted by the user when a device used by the user to enter the past search queries was docked or holstered when the user entered the past search queries. Determining a context associated with the spoken query term further includes determining a location of the user when the spoken query term was spoken by the user, and selecting a subset of the past search queries that include contexts which are similar to the context of the spoken query term further includes selecting a subset of the past search queries that were submitted by the user when the user was within a predetermined distance from the location, or when the user was in a same geographic region as the location. Determining a context associated with the spoken query term further includes determining information that specifies a device or a type of device that the user used to enter the spoken query term, and selecting a subset of the past search queries that include contexts which are similar to the context of the spoken query term further includes selecting a subset of the past search queries that were submitted by the user using the same device or the same type of device that the user used to enter the spoken query term. The actions further include selecting a subset of the past search queries that were submitted by the user as voice search queries and that generated one or more search results that were selected by the user, and determining, for each n-gram, a frequency with which the n-gram occurs in the past search queries further includes determining, for each n-gram, a frequency with which the n-gram occurs in the past search queries that are members of the subset only. The actions further include selecting a subset of the past search queries that were selected by the user from a list of m-best search queries, and determining, for each n-gram, a frequency with which the n-gram occurs in the past search queries further includes determining, for each n-gram, a frequency with which the n-gram occurs in the past search queries that are members of the subset only. The actions further include selecting a subset of the past search queries that include query terms that were entered by the user using a keyboard, and determining, for each n-gram, a frequency with which the n-gram occurs in the past search queries further includes determining, for each n-gram, a frequency with which the n-gram occurs in the past search queries that are members of the subset only. The actions further include determining one or more categories that are associated with each of the past search queries, and, for each n-gram, determining a frequency with which the n-gram occurs in the past search queries further includes determining a particular category that is associated with the n-gram, and determining a quantity of the past search queries that are associated the particular category. The actions further include selecting the candidate transcriptions that have an m highest combined values and providing information to the user that references the selected candidate transcriptions that have the m highest combined values, and selecting the intended query term from among the candidate transcriptions based on the combined values further includes receiving an indication of one of the selected candidate transcriptions that have the m highest combined values that has been selected by the user. Selecting an intended query term from among the candidate transcriptions based on the combined values further includes automatically selecting, as the intended query term, the candidate transcription that has a highest combined value from among the candidate transcriptions.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Figure 1:
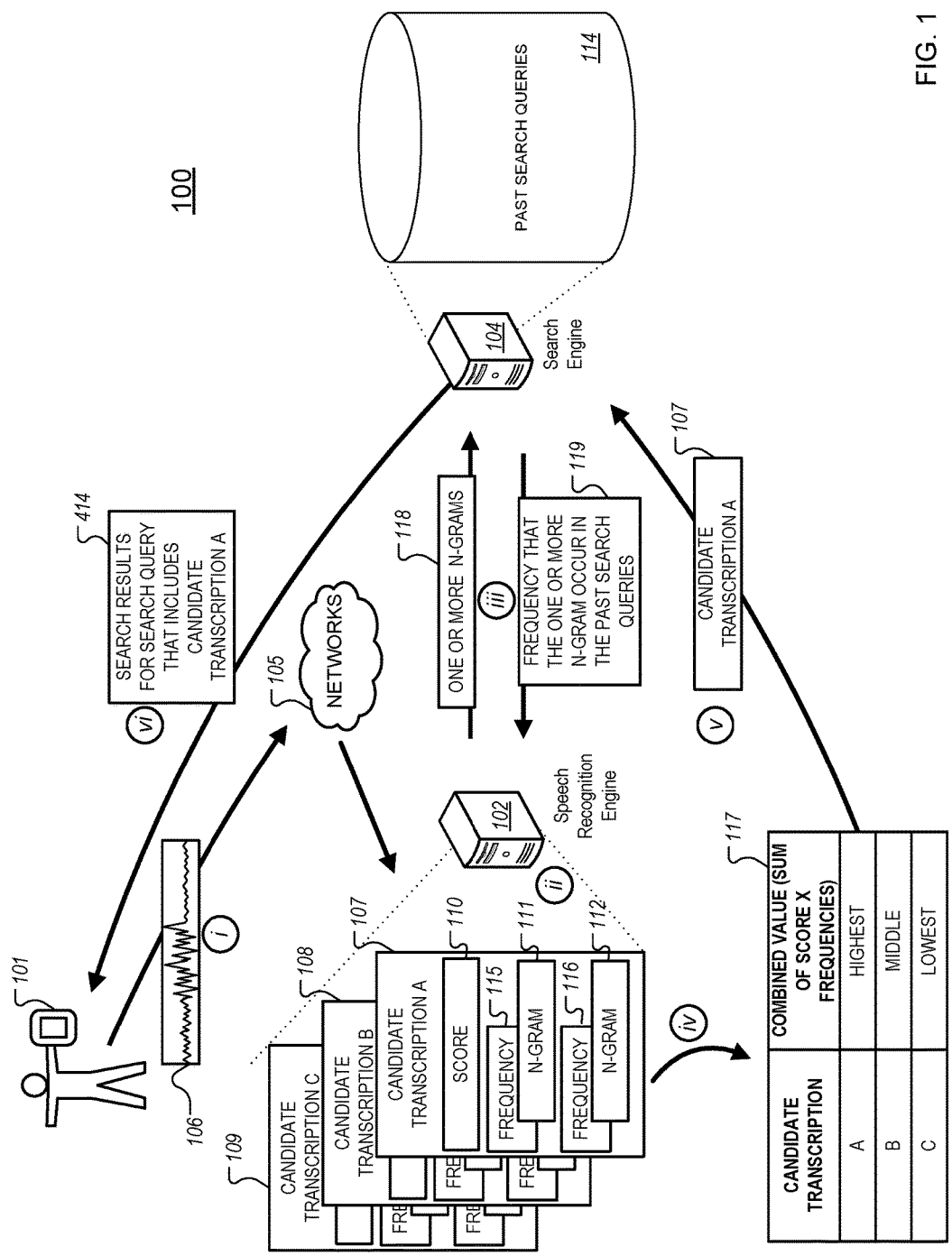
FIG. 1, 2, 3 are diagrams of example systems that can disambiguate a spoken query term.

FIG. 1 is a diagram of an example system 100 that can disambiguate a spoken query term. The system 100 includes a mobile client communication device (or "client device") 101, a speech recognition engine 102 (e.g., an Automated Speech Recognition ("ASR") engine), and a search engine 104 (e.g., an Internet search engine). The client device 101, the speech recognition engine 102, and the search engine 104 communicate with each other over one or more networks 105. FIG. 1 also illustrates a flow of data within the system 100 during time-sequenced states (i) to (vi).

Recognizing spoken query terms is inherently difficult, owing to the existence of background noise and variations in accent and pronunciation, among other factors. In general, the disambiguation process implemented by the system 100 uses a user's recent search history to improve voice search accuracy.

In more detail, the user of the client device 101 speaks a query term into the microphone of the client device 101, during state (i). The utterances that correspond to the spoken query term are encoded in an audio signal (or "audio file," "sample," or "waveform") 106 that is communicated over the networks 105 to the speech recognition engine 102.

During state (ii), the speech recognition engine 102 performs speech recognition on the audio signal 106 and outputs candidate transcriptions 107 to 109 that match the spoken query term. The speech recognition engine 102 also determines a likelihood that each candidate transcription matches the spoken query term 212, as reflected in a speech recognition confidence value, or "score." For example, the speech recognition engine 102 determines a score 110 for the candidate transcription 107. Generally, the higher the speech recognition confidence value, the higher the speech recognition engine 102 determines the likelihood to be that the candidate transcription is an acoustic match for the spoken query term.

The speech recognition engine 102 also generates n-grams from each candidate transcription, for instance by generating n-grams 111 and 112 from candidate transcription 107. Each n-gram represents a subsequence of n items from a corresponding candidate transcription, where the items may be phonemes, syllables, letters, characters, words, or terms.

During state the speech recognition engine 102 counts the number of times (or the "frequency") that the n-grams have occurred in past search queries 114 during a predetermined period of time. Counting the number of times that the n-grams have occurred in the past search queries 114 may include transmitting a request 118 that identifies one or more of the n-grams to the search engine 104, and receiving a response 119 from the search engine 104 that specifies a frequency, or "frequency count," for each identified n-gram.

The frequency is stored so it is associated with each corresponding n-gram. For instance, the number of times that the n-gram 111 occurs in the past search queries 114 is stored in association with the n-gram 111 as frequency count 115, and the number of times that the n-gram 112 occurs in the past search queries 114 is stored in association with the n-gram 112 as frequency count 116.

For each n-gram, the frequency is obtained using the past search queries of the user of the mobile device 101, of other users, or of a group of users that includes the user of the mobile device 101 and other users. The speech recognition engine 102 may count the number of times that the n-grams have occurred in all past search queries 114 or some subset of the past search queries 114. For instance, the speech recognition engine 102 may only count the number of times that the n-grams have occurred in recently submitted, past search queries 114, or in the past search queries 114 that are associated with a context that is similar or identical to a current context of the mobile device 101. Alternatively, for each occurrence of a particular n-gram in the past search queries 114, the speech recognition engine 102 may weight or scale the frequency count based on how recently the past search query was submitted, or how similar a context of the past search query is to a present context associated with the user or the mobile device 101.

During state (iv), the speech recognition engine 102 generates a combined value for each of the candidate transcriptions. In one example, a combined value may be generated for a particular candidate transcription by multiplying, for each of the n-grams associated with the particular candidate transcription, the score for the particular candidate transcription by the frequency count associated with the n-gram, thereby generating a product for each n-gram, and by summing the products for all of the n-grams associated with the particular candidate transaction. In the example shown in table 117, the candidate transcription 107 ("Candidate Transcription A") is determined to have the highest combined value, the candidate transcription 108 ("Candidate Transcription B") has neither the highest nor the lowest combined value, and the candidate transcription 109 ("Candidate Transcription C") has the lowest combined value.

During state (v), the speech recognition engine 102 identifies the candidate transcription 107 to the search engine 104 as having the highest combined value. The search engine 104 performs a search using a query that includes the candidate transcription 107, and generates search results 120. The search results 120 are sent to the mobile device 101 during state (vi).

Figure 2:
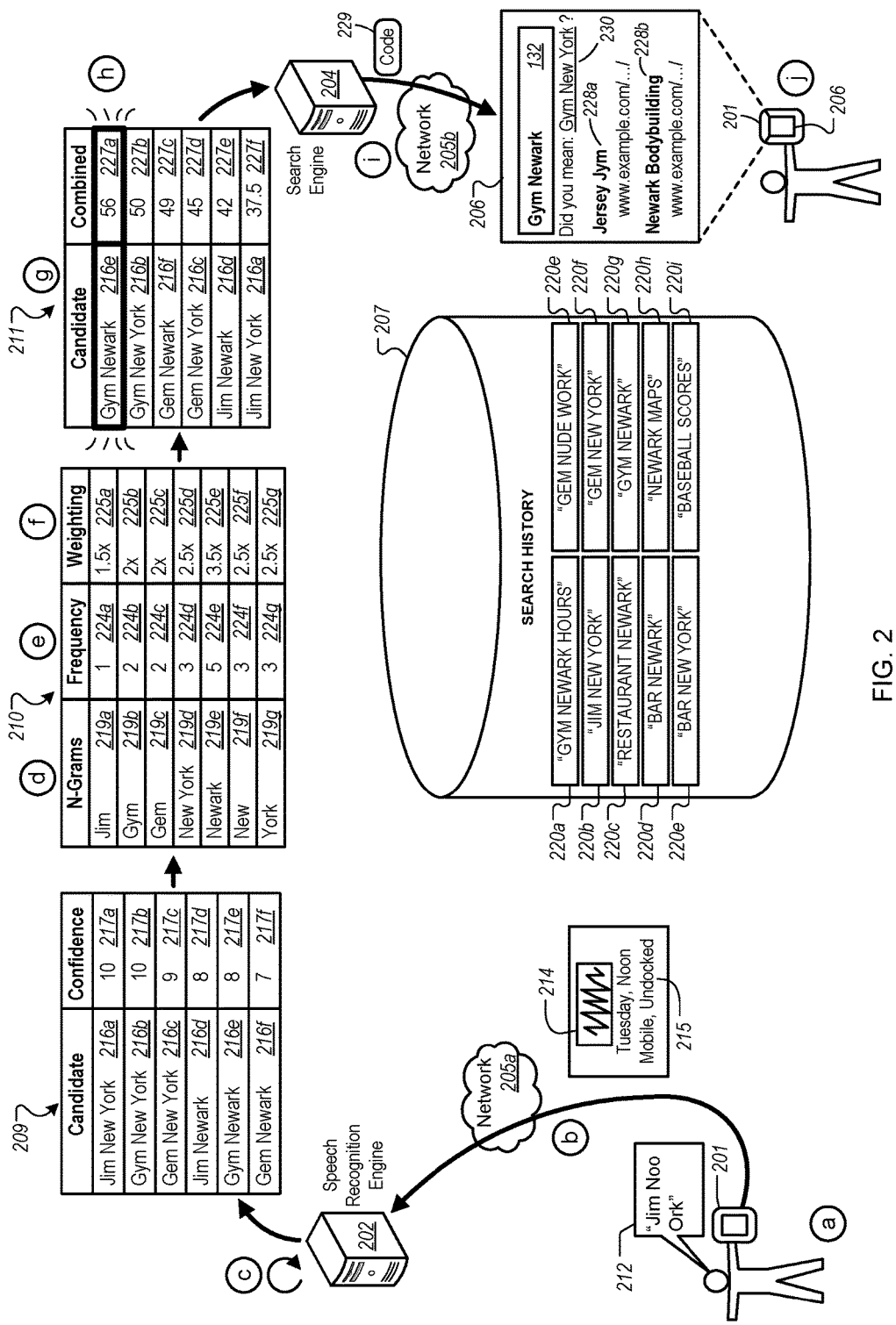

FIG. 2 is a diagram of an example system 200 can disambiguate a spoken query term 212. The system 200 includes a client device 201, a speech recognition engine 202, and a search engine 204 that are in communication over one or more networks 205 (illustrated as network 205a and network 205b). FIG. 2 also illustrates a flow of data within the system 200 during time-sequenced states (a) to (j), a user interface 206 that is displayed on the client device 201 during state (j), a portion of the search history 207 of the user of the client device 201, and tables 209 to 211 that provide example visualizations of the data that is used by the search engine 204 to disambiguate the spoken query term 212.

The user of the client device 201 wish to submit a query using the query term "gym Newark," and does so by initiating a search dialogue on the client device 201 and by speaking that term, during state (a). The user may, for example, press a button on the client device 201 before speaking, speak the query terms, then release the button on the client device 201. In another example, the user may select a user interface control (e.g., an icon representing a microphone) on the client device 101 before speaking the query terms. As yet another example, the microphone may be "on" before the user speaks or may be in an "always-on" state (e.g., the user may simply speak without turning on the microphone), such as where the client device uses a continuous recording buffer.

The utterance, which is phonetically transcribed as "Jim Noo Ork," is encoded in an audio signal 214 that, during state (b), is communicated over the network 205a to the speech recognition engine 202. For example, the client device 201 may create a sound file or data stream when recording the spoken query term 212, and may send the sound file or data stream over the network 205a. In some implementations, the client device 201 may establish a session with the speech recognition engine 202, and may send the audio signal 214 during the session.

The mobile device 201 may also send other data to the speech recognition engine 202 in association with the audio signal 214. For instance, the mobile device 201 may send data that uniquely identifies the client device 201 (or some component thereof), or, if the user opts to provide such information, data that identifies the user of the client device 201 or a group of users that includes the user of the client device 201.

The mobile device 201 may also send context data 215 in association with the audio signal 214. For instance, the context data 215 may include data that specifies a time and date when the query term 212 was received or transmitted by the client device 201 (in the figure, "Tuesday Noon"), data that specifies the type of the client device 201 (in the figure, "mobile") or the type of audio subsystem included in the client device 201, data that references whether the client device 201 was docked or holstered when the query term 212 was received or transmitted by the client device 201, and/or other data The context data 215 may also specify the location of the client device 201, or may include samples of the ambient noise near the client device 201.

During state (c), the speech recognition engine 202 performs speech recognition on the audio signal 214, and outputs candidate transcriptions 216a to 216f that match the spoken query term 212, and speech recognition confidence values 217a to 217f for each respective candidate transcription. Table 209 provides one example visualization of the candidate transcriptions 216 and the associate speech recognition confidence values 217.

The speech recognition engine 202 may perform speech recognition by matching the sounds that correspond to the spoken query term 212 with candidate transcriptions 216 that the speaker may have spoken, using various noise models, acoustic models, language models, popularity models, and other models. The speech recognition engine 202 may use an acoustic model to select candidate transcriptions based on whether their corresponding sounds are an acoustic match to the sounds that correspond to the spoken query terms, and may rank or select the candidate transcriptions based on the fit or closeness of the acoustic match.

Using a combined acoustic and popularity-based model, the speech recognition engine 202 selects query terms based on whether their corresponding sounds are an acoustic match to the sounds that correspond to the spoken query term 212, and ranks or selects the candidate transcriptions based on the closeness of the acoustic match as well as popularity indicators that indicate whether the candidate transcriptions are popular terms among search queries submitted by other users of the speech recognition engine 202 or the search engine 204. Specifically, the popularity model may determine a frequency that the candidate transcriptions are used by the other users in performing past search queries.

In one example, other users of the search engine 204 may use term "gym" in searches more frequently than they use the term "Jim," and may use the term "New York" in searches more frequently than they use the term "Newark." A popularity indicator may be determined for each candidate transcription 216 (or portion thereof) based on the frequency that other users of the search engine 204 used the candidate transcription in past searches, or a frequency that certain portions of the candidate transcription were together in the past searches. For example, a popularity indicator for the term "New York" 219d may indicate that the terms "New" 219f and "York" 219g are frequently used together. Popularity indicators may be stored, for example, in a database accessible to the speech recognition engine 202 or popularity indicators may be obtained from the search engine 204 or from another server.

In some implementations, the speech recognition confidence value may be determined based on a popularity indicator for a particular candidate transcription. For example, for a candidate transcription with a word sequence W, a popularity indicator may be expressed as $P(W)$ (e.g., the probability of the word sequence W) and a speech recognition confidence value $P(S|W)$ (i.e., the probability of speech recognition of the candidate transcription, given the word sequence W), may be calculated as $P(W|S) \cdot P(W)$, where S is a speech recognition indicator (e.g., extent of the acoustic match) of the candidate transcription that is independent of popularity.

In some implementations, a speech recognition confidence value may be calculated in a single pass (and not subsequently rescored) based on both a general popularity model and a user's search history. For example, a speech recognition confidence value $P(S|W,U)$ (e.g., the probability of speech recognition of a candidate transcription with a word sequence W given the word sequence W and the user's past search history U) may be calculated as $P(W|S) \cdot P(W,U)$, where $P(W,U)$ is a joint probability of the word sequence W and the user's search history U. The joint probability $P(W,U)$ may be calculated as $\alpha \cdot (P(W)) + (1-\alpha) \cdot P(U)$, where a is an interpolation constant. $P(W,U)$ may be calculated, as described below, based on matching the context of a current search query to contexts of a user's past search queries. Other approaches may be used to calculate $P(W,U)$.

The speech recognition engine 202 may filter the candidate transcriptions 216 that have a corresponding speech recognition confidence value 217 below a predefined threshold. Alternatively, the speech recognition engine 202 may filter the candidate transcriptions 216 that are not among the N candidate transcriptions having the N highest speech recognition confidence. The selection of the value N may be based, for example, on information concerning the size, dimensions, or capabilities of the display on the client device 201.

During state (d), the speech recognition engine 202 generates n-grams 219 from the candidate transcriptions 216. As shown in table 210, which is an example visualization of the data generated by the speech recognition engine 202 during this state, the n-grams 219 of the candidate transcriptions 216 include the terms "Jim" 219a, "gym" 219b, "gem" 219c, "New York" 219d, "Newark" 219e, "new" 219f, and "York" 219g. Other n-grams may also be generated from the candidate transcriptions 216, including n-grams that are identical to a candidate transcription itself (e.g., the n-gram "Jim New York"), and other n-grams that are letters or characters that do not make up a whole word.

During state (e), the speech recognition engine 202 determines the frequency with which the n-grams 219 occur in the user's search history 207. The search history 207, which references query terms 220a to 220j that were included in past search queries, may be stored by the client device 201 or by the search engine 204.

The frequency counts 224 are stored in the table 210 in association with each respective n-gram. In table 210, a frequency count of "1" is stored for the n-gram "Jim" since "Jim" occurs only once in the search history 207, in query term 220b; a frequency count of "2" is stored for the n-gram "Gym," since "Gym" occurs twice in the search history 207, in query terms 220a and 220g; and so on.

Instead of or in addition to merely counting the number of times an n-gram occurs in the user's search history, the frequency count may be adjusted or scaled upwards or downwards based on the quality of a match between a candidate transcription and the query terms 220 stored in the user's search history. For instance, a frequency count may be adjusted or scaled downwards, even to a zero-value frequency, if an n-gram occurs in a query term, but the query term was included in a search query that was performed a long time ago (e.g., more than a predetermined threshold duration). Conversely, a frequency count may be adjusted or scaled upwards if an n-gram occurs in a query term that was included in a search query that was performed recently, such as the same day as the query term 212 was spoken.

Context similarity may also be used as a surrogate for determining a quality match. For instance, a frequency count may be adjusted downwards if an n-gram occurs in a query term that was included in a search query that is associated with a context which is dissimilar to the current context of the mobile device 201. Similarly, a frequency count may be adjusted or scaled upwards if an n-gram occurs in a query term that was included in a search query that was performed in a context which is similar or identical to the current context of the mobile device 201. In addition to or instead of affecting the frequency count, quality matching may also be used to independently adjust other values, such as weighting values 225 or combined values 227.

During state (f), the speech recognition engine 202 determines weighting values 225 for the n-grams 219 based on the corresponding frequency counts 224. For example, the magnitude of a weighting value may correlate to the magnitude of the associated frequency count. In table 210, the weighting values 225 are expressed as multipliers, i.e., values that are to be multiplied with the confidence values 217 or the frequency counts 224.

For example, the speech recognition engine 202 selects a weighting value 225a of "1.5," based on the frequency count 224a of "1"; selects weighting values 225b and 225c of "2," based on the frequency counts 224b and 224c of "2"; selects weighting values 225*d*, 225*f* and 225*g* of "2.5," based on the frequency counts 224*d*, 224*f*, and 224*g* of "3"; and selects weight value 225*e* of "3.5" based on the frequency count 224*e* of "5." In table 210, the weighting values 225 correlate linearly with the frequency count 224, as provided by Equation (1), below:

$$\text{weighting value} = (\text{frequency count} + 2) + 1 \quad (1)$$

In other examples, the weighting values 225 may correlate non-linearly with the frequency count 224, or may be zero values. In another example, if a frequency count is zero, an associated weighting value may have a negative value. A weighting value 225 may be expressed as a percentage or as a quantity. The weighting values 225 may be assigned by recompiling a language model finite state transducer for use by the speech recognition engine 202. The weighting values 225 may be smoothed so that n-grams 219 that do not occur in the search history 207 are still assigned a non-zero weighting value.

During state (g), the speech recognition engine 202 determines a combined value for each candidate transcription 216 based on combining the speech recognition confidence values 217 with the respective frequency counts 224 and/or the weighting values 225 for the n-grams 219. Other approaches may be used to determine combined values 227, by using naive Bayes or logistic regression, or some other linear or nonlinear probabilistic machine learning technique.

The combined values 227, shown in table 211, are stored in association with the candidate transcriptions 216. The combined value associated with a particular candidate transcription represents a likelihood, as determined by the speech recognition engine 202, that the user intended the particular candidate transcription. In table 211, the candidate transcription "gym Newark" 216*e* has the highest likelihood, with a combined value 227*a* of "56."

During state (h), the search engine 204 selects one or more of the candidate transcriptions 216 (as the "intended query terms"), and identifies these transcriptions 216 to the search engine 204. For example, the search engine 204 may select the candidate transcription that has the highest combined value (e.g., the candidate transcription "gym Newark" 216*e*). In some implementations, the search engine 204 may perform an implicit, or automatically-invoked search query that includes the candidate transcription that has the highest combined value. An implicit search query may be performed if certain conditions are met, such as if the highest combined value 227*a* indicates a high likelihood of user intent. Such a high likelihood may be established from a high combined value 227*a*, indicating that the user's intent is quite unambiguous, in either absolute or relative terms.

A search query may be implicitly performed, for example, if the highest combined value 227*a* is higher than a threshold (e.g., "30"). As another example, a search query may be implicitly performed if the highest combined value 227*a* is at least two times the second highest combined value 227*d*. As a third example, a search query may be implicitly performed if the highest combined value 227*a* is at least three times the second highest combined value 227*a* and also greater than a threshold (e.g., "20"). In other words, in some implementations, in an example such as where the highest combined value 227*a* is low (e.g., less than a low-value threshold, such as "5") and every other combined value is lower still (e.g., "2" or less), a search query using the candidate transcription which has the highest combined value 227*a* might not be implicitly performed even though the highest combined value 227*a* is at least two times greater than every other combined value, because the highest combined value 127 did not exceed a low-value threshold.

During state (i), the search engine 204 performs a search query using the candidate transcription 216*e*, and generates search results 228*a* and 228*b*. The search engine 204 generates computer code 229 (e.g., HTML code) that references the search results 228, and communicates the computer code 229 over the network 205*b* to the client device 201.

During state (j), the client device 201 processes the computer code 229, and displays the search results 228 on the user interface 206. The user may select a search result, or, if the candidate transcription 216*e* was not what the user intended, the user may submit another search query. For instance, the user may select a control 230 that references another candidate transcription, such as the candidate transcription 216*b* that had the second-highest combined value 227*b*.

Figure 3:
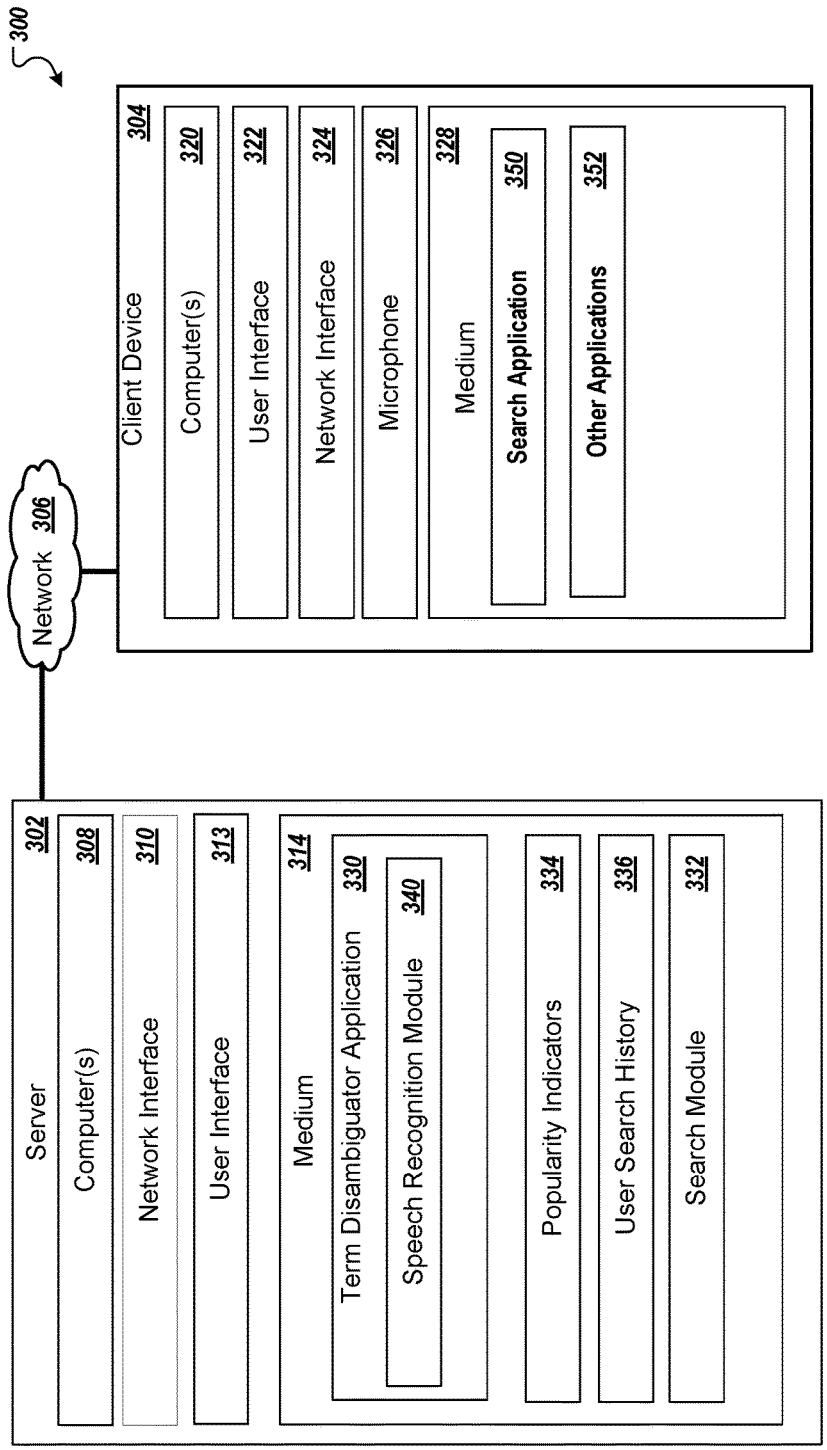

FIG. 3 illustrates an example system 300 that may be used for disambiguating a spoken query term. The system 300 includes a server 302 in communication with one or more client devices 304 over a network 306. The server 302 includes, among other things, one or more computers 308 that each include one or more processors, a network interface 310, a user interface 313, and a computer-readable storage medium 314. The server 302 may be a search engine, or the server 302 may be used by a search engine to perform speech recognitions. The client device 304 includes one or more computers 320 that each include one or more processors, a user interface 322, a network interface 324, a microphone 326, and a medium computer-readable storage medium 328. The client device 304 may be a mobile phone, a tablet computer, a music player, an e-book reader, a laptop computer, PDA, smart phone, BlackBerry™ or other handheld or mobile device. In another implementation, the client device 304 is not portable or mobile, but rather is a desktop computer or a server.

The server 302 may be connected to the network 306 and possibly to one or more other networks over the network interface 310. Similarly, the client device 304 may be connected to the network 306 and possibly to one or more other networks over the network interface 324. The network 306 may include, for example, one or more of the Internet, Wide Area Networks (WANs), Local Area Networks (LANs), analog or digital wired and wireless telephone networks (e.g., a PSTN, Integrated Services Digital Network (ISDN), and Digital Subscriber Line (xDSL)), radio, television, cable, satellite, and/or any appropriate other delivery or tunneling mechanism for carrying data services. Networks may include multiple networks or subnetworks, each of which may include, for example, a wired or wireless data pathway.

The computer-readable storage mediums 314 and 328 each store and record information or data, and each may be an optical storage medium, magnetic storage medium, flash memory, or any other appropriate storage medium type. The medium 328 stores a search application 250 and possibly one or more other applications 352. The search application 350 may provide a search user interface to users of the client device 304 which allows users to enter voice commands to perform Internet searches and perform other actions such as dialing contacts, communicating with contacts through email or other electronic communication, making electronic bill payments, getting directions to or other information about a point of interest (POI), or other actions.

The medium 314 stores a term disambiguator application 330, a search module 332, a popularity indicators 334, and user search history 336. The search module 332 may perform search queries and may be included in the medium 314, for example, in implementations where the server 302 is or includes a search engine.

The term disambiguator application 330 includes a speech recognition module 340. The speech recognition module 340 performs speech recognition on a received audio signal (e.g., a spoken query term received from the client device 304) to identify one or more candidate transcriptions that match the audio signal. The speech recognition module 340 may determine a speech recognition confidence metric for each identified candidate transcription which indicates a confidence that the candidate transcription matches the audio signal. Speech recognition confidence metrics may be adjusted based on the popularity indicators 334. The popularity indicators 334 indicate a frequency that words or other n-grams have been used by users of the server 302 in general, such as for search queries performed by a search engine (e.g., queries performed by the server 302 or by one or more other search engine servers).

The term disambiguator application 330 may further adjust speech recognition confidence metrics by weighting speech recognition confidence metrics for respective candidate transcriptions based on how often components (e.g., n-grams) of the candidate transcription were included in past search queries issued by the user who submitted the query (e.g., the user of the client device 304). Weightings may be based on how often, or the extent to which, n-grams of the candidate transcription were included in queries that include contexts which are similar to the context of the spoken query term.

The computers 308 process operating system or application program computer instructions for the server 302. Similarly, the one or more computer(s) 320 process operating system or application program computer instructions for the client device 304. The user interface 322 displays application user interfaces that include user interface controls for applications that run on the client device 304. For example, the user interface 322 may display an interface for the search application 350. The user interface 313 displays application user interfaces for applications that run on the server 302. For example, the user interface 313 may display an interface for an administrator application that is used to configure, monitor, and invoke the term disambiguator application 330.

Figure 4:
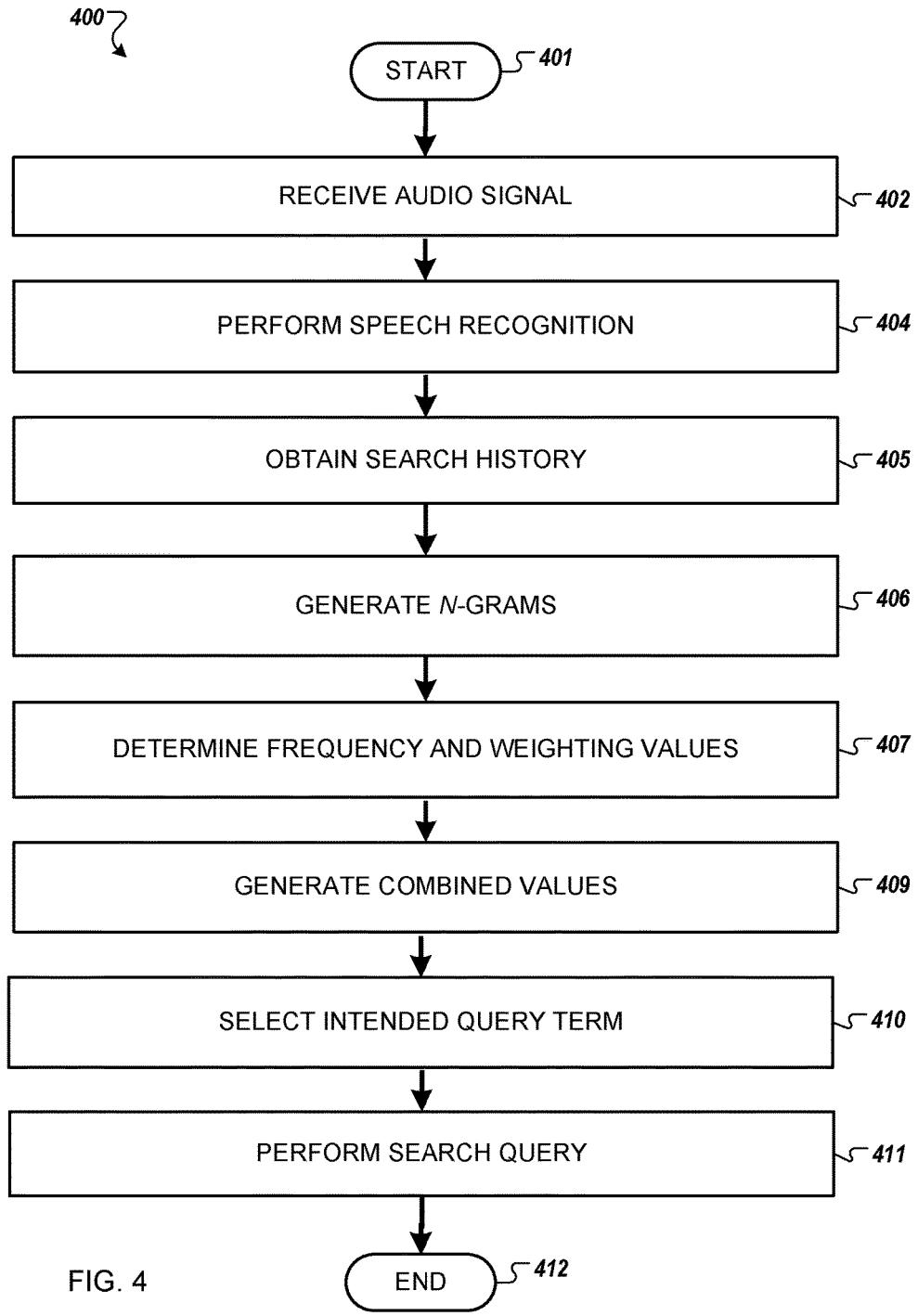
FIG. 4 is a flowchart of a process.

FIG. 4 is a flowchart of a process 400. The process 400 uses a user's recent search history to improve voice search accuracy. For example, if the user searched for a query term last week, a process 400 is used to infer that it is more likely that the user will search for the same query time again at a current time, than would otherwise be expected by chance. This inference can be used to select an intended transcription of a spoken query term.

Briefly, the process 400 includes the actions of receiving an audio signal that corresponds to a spoken query term, performing speech recognition on the audio signal to select two or more textual, candidate transcriptions that match the spoken query term, and to establish a speech recognition confidence value for each candidate transcription, obtaining a search history for a user who spoke the spoken query term, where the search history references one or more past search queries that have been submitted by the user, generating one or more n-grams from each candidate transcription, where each n-gram is a subsequence of n phonemes, syllables, letters, characters, words or terms from a respective candidate transcription, determining, for each n-gram, a frequency with which the n-gram occurs in the past search queries, and a weighting value that is based on the respective frequency, generating, for each of the candidate transcriptions, a combined value based on combining the speech recognition confidence value for the candidate transcription with the weighting value for one or more of the n-grams that are generated from the candidate transcription, selecting an intended query term from among the candidate transcriptions based on the combined values, and causing a search engine to perform a search query that includes the intended query term.

In more detail, when the process begins (401), an audio signal is received (402), where the audio signal may correspond to a spoken query term. The speech recognition engine may receive the audio signal from the client device indirectly, for instance where the client device transmits the audio signal to a search engine that, in turn, transmits the audio signal to the speech recognition engine.

Speech recognition is performed on the audio signal to select two or more textual, candidate transcriptions that match the spoken query term, and to establish a speech recognition confidence value for each candidate transcription (404). A speech recognition engine may disambiguate the audio signal by matching the sounds included in the audio signal to two or more candidate transcriptions that the speaker may have spoken using an acoustic model and possibly a popularity-based model. Using a popularity model may include, for example, boosting (or otherwise adjusting) speech recognition confidence values if all or parts of the candidate transcription are identified as being popular words used, in general, by users of the speech recognition engine and/or by users of a search engine.

The candidate transcriptions that have a corresponding speech recognition confidence value above a predefined threshold may be selected as part of a subset of candidate transcriptions. As another example, the N candidate transcriptions having the N highest speech recognition confidence values may be selected, where N is a positive integer (e.g., ten).

A search history is obtained for a user who spoke the spoken query term (405). For example, a search history for the user may be obtained from a server-side database. The search history may reference one or more past search queries that have been submitted by the user, and may include query terms, one or more categories, and context data associated with the past search queries.

One or more n-grams are generated from each candidate transcription (406). An n-gram is a sequence of characters that may form a part of, or all of, a candidate transcription. For each n-gram, a frequency with which the n-gram occurs in the past search queries is determined, and a weighting value that is based on the respective frequency is determined (407). For example, determining a frequency with which an n-gram occurs in the past search queries may include determining a frequency with which the n-gram occurs in past search queries that are members of a subset of the past search queries that include contexts which are similar to the context of the spoken query term.

A frequency is determined for each n-gram, where the frequency represents a number of times that the n-gram occurs in the past search queries, or some subset thereof. As another example, a frequency may be determined for each n-gram by determining a particular category that is associated with the n-gram and determining a quantity of the past search queries that are associated with the particular category. The frequency may be weighted or scaled based on other factors, such as the recency of a particular past search query, or the extent to which a context of a candidate transcription that is associated with an n-gram matches the context of a past search query that includes the n-gram.

For each of the candidate transcriptions, a combined value is generated based on combining the speech recognition confidence value for the candidate transcription with the weighting value for one or more of the n-grams that are generated from the candidate transcription (409). A combined value may be determined, for example, by adding together the associated speech recognition confidence value and an adjustment for each n-gram included in the associated candidate transcription, where the adjustment is determined by the associated weighting value.

An intended query term is selected from among the candidate transcriptions based on the combined values (410). Selecting the intended query term may include automatically selecting the candidate transcription that has a highest combined value from among the candidate transcriptions. The candidate term that has the highest combined value may be automatically selected, for example, if the highest combined value is higher than a threshold. As another example, selecting the intended query term may include generating an m-best list which identifies the m most likely candidate transcriptions of the spoken query term and providing a user interface which presents the m-best list. An indication may be received which indicates user selection of one of the selected candidate transcriptions that have the m highest combined values.

A search query is performed using the intended query term (411), thereby ending the process 300 (412). For example, a search query may be implicitly performed using a selected candidate transcription having the highest combined value if the highest combined value is higher than a threshold. As another example, a search query may be executed in response to user selection of a candidate transcription from a list of suggested candidate transcriptions. A client device may cause a search engine to perform the search query by, for example, transmitting an HTTP request to the search engine.

Figure 5:
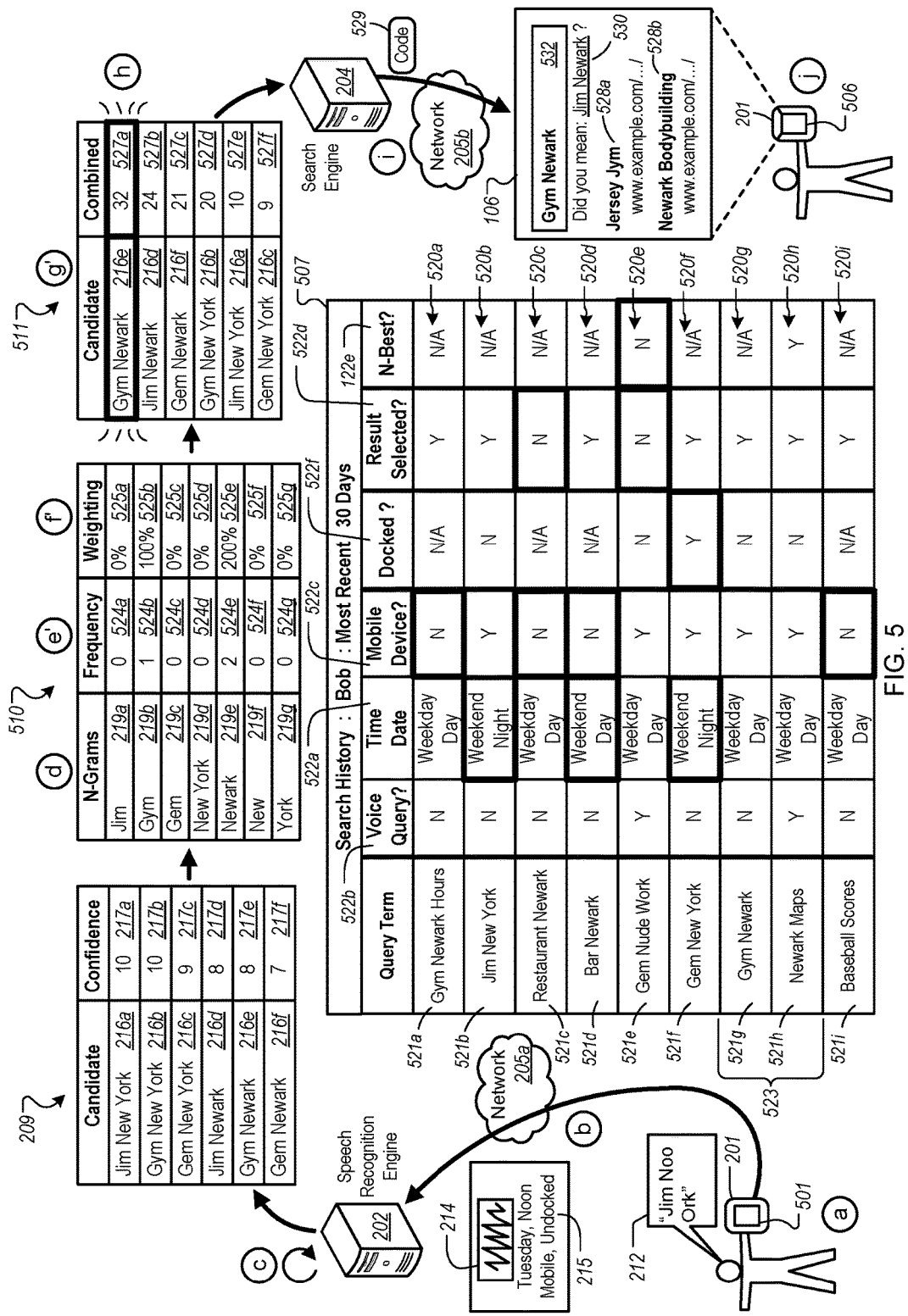
FIGS. 5 and 6 are diagrams that illustrate the disambiguation of a spoken query term.

FIG. 5 is a diagram of a system 500 that may be used for disambiguating a spoken query term. Like system 200 of FIG. 2, system 500 includes a client device 201, a speech recognition engine 202, and a search engine 204, in communication with each other by one or more networks 205.

During state (a), the user of the client device 201 performs a query using the query term 212 ("gym Newark") by initiating a search dialogue on the client device 201 and by speaking an the query term, which are phonetically transcribed as "Jim Noo Ork." The search dialogue may involve a user interface 501 that includes a search box for receiving query terms and/or for receiving voice input, or the search dialogue may not involve a user interface 501. In some examples, the user may select a search box on the user interface 501 to activate voice control before speaking query terms, where the search box may be a persistent or semi-persistent feature of the user interface 501. For example, the search box may be included on a browser toolbar that remains on the user interface 501 when the browser is executing, or the user may navigate to the search box by entering a URI associated with a web resource (e.g., a search engine home page) that includes the search box. As another example, the search box may be persistently or semi-persistently included on a system interface of the client device 201, such as on a system taskbar or on a system background, or "home" interface. In many respects, state (a) of FIG. 5 is similar to state (a) of FIG. 2.

The sounds or utterances that correspond to the spoken query term 212 are encoded in an audio signal 214 that, during state (b), is communicated over the network 205a to the speech recognition engine 202. By sending audio signals to the speech recognition engine 202 to perform the speech recognition, fewer resources are required by the client device 201. Other data, including context data 215, may also be communicated with the audio signal 214. In many respects, state (b) of FIG. 5 is also similar to state (b) of FIG. 2.

During state (c), the speech recognition engine 202 performs speech recognition on the audio signal 214 to output candidate transcriptions 216a to 216f that match the spoken query term 212. In addition to selecting the candidate transcriptions 216, the speech recognition engine 202 determines a speech recognition confidence value for each candidate transcription. State (c) of FIG. 5 is also similar, in many respects, to state (c) of FIG. 2.

In some implementations, a multiple pass system may be used to generate speech recognition confidence values, by adjusting the speech recognition confidence values multiple times, for different reasons. For example, as described below, in some implementations, a speech recognition confidence value may be rescored a first time based on a general popularity model and may be rescored a second time based on a user's search history. In some implementations, a speech recognition confidence value may be rescored a single time, using a single interpolated grammar which has been compiled to include aspects of both a general popularity model and a user's search history.

In some implementations, a speech recognition confidence value may be adjusted based on the popularity indicator for a particular candidate transcription 116, where the higher the popularity indicator, the larger an increase to the associated speech recognition confidence value. The speech recognition confidence value may be increased linearly or non-linearly based on an associated popularity indicator (e.g., a speech recognition confidence value may be increased in proportion to the popularity of the candidate transcription). As another example, a speech recognition confidence value may be increased linearly or non-linearly if an associated popularity indicator is above a threshold and a speech recognition confidence value may be decreased linearly or non-linearly if an associated popularity indicator is below a threshold (e.g., speech recognition confidence values for popular candidate transcriptions may be increased and speech recognition confidence values for unpopular candidate transcriptions may be decreased, based on the popularity or unpopularity of the candidate transcription).

Thus, using a combined acoustic and popularity-based model, a speech recognition confidence value for a candidate transcription may be adjusted based on the popularity of the entire candidate transcription and/or on the popularity of portions of the candidate transcription. For example, a candidate transcription may receive a higher speech recognition confidence value than another candidate transcription, even if the other candidate transcription is better acoustic match. For example, the candidate transcription "gym New York" 216b may be ranked higher than the candidate transcription "Jim Newark" 216d, even if the candidate transcription "Jim Newark" 216d is a better acoustic match than the candidate transcription 216b. This is so because the term "gym" 219b is more popularly used by other users in performing searches than the term "Jim" 219a, and because the term "New York" 219d is more popularly used by other users in performing searches than the term "Newark" 219e.

The speech recognition engine 202 may generate or select a subset of the candidate transcriptions 216 that have a corresponding speech recognition confidence value 217 above a predefined threshold. For example, the predefined threshold may have a value of "5", such that candidate transcriptions 216 that satisfy the threshold (e.g., that have an associated speech recognition confidence value greater than or equal to "5") are not filtered or excluded, and candidate transcriptions 216 that have a speech recognition confidence value that does not satisfy the threshold may be filtered, deleted, ignored or otherwise excluded from further processing. For example, a candidate transcription "Jim New Work" may be excluded from further processing based on having a speech recognition confidence value below a threshold (e.g., having a speech recognition confidence value of four when a predefined threshold is "5").

As another example, the N candidate transcriptions having the N highest speech recognition confidence values may be selected as a subset of the candidate transcriptions, where N is a positive integer (e.g., "6"). Candidate transcriptions that do not have one of the N highest speech recognition confidence values may be deleted, ignored or otherwise excluded from further processing. For example, a candidate term "Gin Newark" may be excluded from further processing if it has a seventh highest speech recognition confidence value when the value of N is "6". In some implementations, the N candidate transcriptions having the N highest acoustic matches are selected, and the associated speech recognition confidence value 117 for each selected candidate transcription may be subsequently adjusted based on a popularity model. In some implementations, N candidate transcriptions are selected after acoustic match scores have been adjusted based on a popularity model. The selection of N may be based, for example, on an estimation of the size or dimensions of the user interface 501, or based on an estimation of the size of the display of a typical mobile device (e.g., as discussed below, candidate transcriptions may be presented on a user interface, and the selection of N may be based on how many candidate transcriptions 216 might fit vertically in a particular or a typical user interface display).

During state (d), the speech recognition engine 102 identifies n-grams 219 included among the candidate transcriptions 216. As shown in table 510, the n-grams 219 include the terms "Jim" 219a, "gym" 219b, "gem" 219c, "New York" 219d, "Newark" 219e, "new" 219f, and "York" 219g. In general, state (d) of FIG. 5 is also similar in some respects to state (d) of FIG. 2.

The example shown in FIG. 5 begins to deviate from the example of FIG. 2 beginning in state (e'). Unlike state (e) of FIG. 2, in which a frequency was primarily determined based on the number of times an n-gram occurred in the user's entire search history, or in the user's recent search history, in state (e') of FIG. 5, the frequency is determined based on the number of times an n-gram occurred in those past searches of the user's search history that have a context that is similar or identical to that of the mobile device 201.

During state (e'), the speech recognition engine 202 or the search engine 204 obtains at least a portion of the search history 507 of the user who spoke the spoken query 212 100, and determines the frequency with which the n-grams 219 occur in a subset 523 of the past search queries 520 that are referenced by the search history 507. Each entry in the search history 507 may record information about the past search queries 520, such as query terms 521 associated with the past search queries 520 and context data 522 associated with the past search queries 520. When the user initiates a voice search, the search history 507 may be retrieved from the database and may be used to improve recognition accuracy.

The context data 522 may include, for example, data that references the date and time of submission or receipt of the past search queries 520 (reference 522a), data that references whether the past search queries 520 were initiated by voice or by keyboard entry (reference 522b), data that identifies a device or that references a type of device the user used to submit the past search queries 520 (e.g., mobile phone, desktop computer, etc.)(reference 522c), data that references whether the user initiated an action after seeing the search results of the past search queries 520 (e.g., did the user click a result) (reference 522d), data that references whether the user chose an alternative recognition of his voice search query from an m-best list (reference 522e), or data that references whether the user's device was docked in a desktop docking station or car holster (reference 522f). Other context data 522 may be stored, such as the user's location and whether a voice search query was performed automatically on behalf of the user or whether the user was presented with a list of suggested m-best recognitions of the voice search query, or other context data.

Different context data may be stored for different past search queries 520. For each past search query, context data may be stored for some, none, or all categories of context data. For example, for past search queries 520a, 520c, 520d, and 520i received from a non-mobile device, context data indicating whether the device was docked may not be available and therefore may not be stored. As another example, context data indicating whether the user chose an alternative recognition of his voice search query from an m-best list is not applicable for past search queries 520a-520d, 520f, 520g, and 520i, which correspond to search queries the user entered using a keyboard. Therefore, such context data may not be stored for those past search queries.

The amount or type of context data that is stored for a search query may be dynamically determined based on a number of factors. For example, the amount or type of context data stored for a search query may be determined by a type of browser a user used to submit the past search query, a user preference or opt-in setting, a configuration of the user's browser (e.g., whether the browser accepts cookies) or whether the user was an authenticated user (e.g., logged into a user account associated with the search engine 204) at the time the user submitted the past search query.

The subset 523 of the past search queries 520 may be selected, for instance, based on the similarity of their associated contexts with the context of the spoken query term 212. In selecting the subset 523, recent search queries may be selected, since search queries that the user initiated a long time ago may no longer be relevant to the user. Alternatively, more weight may be given to queries that are from a context and device that matches the user's current context and device when the spoken query term 212 is spoken. For example, if the user is in his car and the client device 501 is a mobile phone, only search queries that were initiated when the user was previously also in his car on his mobile phone may be selected. Alternatively, more weight may be given to voice search queries than to typed search queries, since the distribution of queries is likely to be closer to what the user has spoken. Further alternatively, more weight may be given to voice search queries where the user took an action indicating that he was satisfied with the accuracy of the speech recognition result. Satisfaction may be measured by signals that indicate that the user clicked on a search result or manually selected a particular candidate transcription from a list of suggested candidate transcriptions.

In the illustrated example, the context data 215 indicates that the spoken query term 212 was spoken or transmitted by the client device 201 on "Tuesday" at "Noon," that the spoken query term 212 was submitted through a "mobile" client device 201, and that the client device 201 was "undocked" when the spoken query term 212 was submitted. In this regard, the subset 523 of the past search queries 520 may be selected based on the similarity between their respective associated contexts and the context data 215.

Different approaches may be used to select the subset 523. For example, in some implementations, an inclusion approach may be used where a similarity score is generated for each of the past search queries 520, where a similarity score indicates the similarity of a respective past search query 520 to the context data 215. Past search queries 520 having a similarity score above a threshold may be included in the subset 523. According to this approach, the subset 523 is built by iteratively examining past search queries 520, by selecting particular past search queries to be part of the subset if they satisfy particular criteria, and by halting the building of the subset 523 when the subset includes a predetermined number of past search queries 520, or when all past search queries of the search history 507 have been examined.

As another example and as described in more detail below, an exclusion approach may be used where past search queries 520 which differ from the context data 215 (where difference may be determined in a number of ways, as described below) are excluded from the subset 523. According to this approach, the subset 523 is built by obtaining the search history 507 (or a portion of the search history 507), by filtering or excluding those past search queries 520 of the search history that do not satisfy particular criteria, and by halting the building of the subset 523 when the search history includes fewer than a predetermined number of past search queries 520, or when the entire search history 507 (or the entire portion of the search history 507) has been examined.

In one example of this latter, exclusion approach, the search history 507 reflects that the search query 520a, which includes the query term "gym Newark hours" 521a, was, among other things, not submitted as a voice search query, was submitted during the daytime on a weekday, was not submitted through a mobile device, and produces a result that was selected by the user. Since the context data 215 indicates that the spoken query term 212 was submitted through a "mobile" client device 201 but the search query 520a was not submitted through a mobile device, the contexts are, in this example, not similar. Accordingly, the search query 520a is not selected as part of the subset 523. The thick, dark border around the cell for context data 122c for the search query 520a (e.g., mobile device equal to "N") illustrates that the particular context data in the cell was a determining factor for why the search query 520a is not selected as part of the subset 523. The search query 520i with query term "baseball scores" 521i has context data which is similar to the context data for the search query 520a, and the search query 520i is similarly excluded from the subset 523.

The search history 507 reflects that the search query 520b, which includes the query term "Jim New York" 521b, was, among other things, not submitted as a voice search query, was submitted during the nighttime on a weekend, and was submitted through a mobile device. Since the context data 215 indicates that the spoken query term 212 was submitted at noon on a Tuesday but the search query 520b was submitted at night on a weekend, the contexts are, in this example, not similar. Accordingly, the search query 520b is not selected as part of the subset 523. The thick, dark border around the cell for context data 522a for the search query 520b (e.g., time and date equal to "weekend night") illustrates that the particular context data in the cell was a determining factor for why the search query 520b is not selected as part of the subset 523.

The search query 520d is excluded from the subset 523 for reasons similar to the exclusion of the search queries 520a and 520b. Specifically, the search history 507 reflects that the search query 520d, which includes the query term "Bar Newark", was, among other things, not submitted as a voice search query, was submitted during the daytime on a weekend, and was not submitted through a mobile device. Since the context data 215 indicates that the spoken query term 212 was submitted through a "mobile" client device 201 on a weekday during the day but the search query 520d was not submitted through a mobile device and was submitted during the daytime on a weekend, the contexts are, in this example, not similar. Accordingly, the search query 520d is not selected as part of the subset 523. As in the examples above, the cells including context data values which are determining factors for why the search query 520d is not selected in this example as part of the subset 523 are shown with thick, dark borders in the row of the search history 507 corresponding to the search query 520d.

The search history 507 reflects that the search query 520f, which includes the query term "gem New York" 521f, was, among other things, not submitted as a voice search query, was submitted during the nighttime on a weekend, and was submitted through a mobile device while the mobile device was docked. Since the context data 215 indicates that the spoken query term 212 was submitted at noon on a Tuesday while the client device 201 was undocked but the search query 520b was submitted at night on a weekend from a docked mobile device, the contexts are, in this example, not similar. Accordingly, the search query 520f is not selected as part of the subset 523. As in the examples above, the cells including context data values which are determining factors for why the search query 520f is not selected in this example as part of the subset 523 are shown with thick, dark borders in the row of the search history 507 corresponding to the search query 520f.

Data indicating whether a device is docked or harnessed may also be used as a criteria for inclusion in the subset 523, because users may tend to make different types of queries when a device is docked as compared to when a device is undocked. For example, a user may request more navigational searches when a mobile device is docked, since the mobile device may likely be docked in a car holster, indicating that the user is likely to be driving (e.g., the user may tend to make navigational searches while driving).

The search history 507 reflects that the search query 520c, which includes the query term "Restaurant Newark" 521c, was, among other things, not submitted as a voice search query, was submitted during the daytime on a weekday, was not submitted through a mobile device, and that the user did not select a search result associated with the search query 520c. Since the context data 215 indicates that the spoken query term 212 was submitted through a "mobile" client device 201 but the search query 520c was not submitted through a mobile device, the contexts are, in this example, not similar. Also, the fact that the user did not select a search result is a strong indication that the user was not satisfied with the search query 520c. Accordingly, the search query 520c is not selected as part of the subset 523. As in the examples above, the cells including context data values which are determining factors for why the search query 520c is not selected in this example as part of the subset 523 are shown with thick, dark borders in the row of the search history 507 corresponding to the search query 520c.

The search history 507 reflects that the search query 520e, which includes the query term "gem nude work" 221e, was, among other things, submitted as a voice search query, was submitted during the daytime on a weekday, and was submitted through a mobile device, all of which match the context of the spoken query term 212. However, the search history 507 reflects that the user did not manually select the search query 520e from a list of suggested candidate transcriptions, which may indicate that the search query 520e was performed automatically as a selected candidate transcription. Additionally, like for the search query 520c, the user did not select a search result associated with the search query 520e, indicating that the user was not satisfied with the search query 520e (e.g., not satisfied with the candidate transcription which was automatically selected). Accordingly, the search query 520e is not selected as part of the subset 523. As in the above examples, the cells including context data values which are determining factors for why the search query 520e is not selected in this example as part of the subset 523 are shown with thick, dark borders in the row of the search history 507 corresponding to the search query 520e.

The above examples discuss reasons why the search queries 520a-520f, and 520i are excluded from the subset 523. The subset 523 thus includes the remaining search queries (e.g., the search queries 520g and 120h). The search history 507 reflects that the search query 520g, which includes the query term "gym Newark" 521g, was, among other things, submitted during the daytime on a weekday, and was submitted through a mobile device while the mobile device was undocked, all contexts which match the spoken query term 212. The search history 507 also reflects that the search query 520g was not submitted as a voice search query, which does not match the context of the spoken query term 212. However, the search history 507 reflects that the user selected a search result associated with the search query 520g, which is a strong indication that the user was satisfied with the search query 520g.

The search history 507 reflects that the search query 520h, which includes the query term "Newark Maps" 521h, was, among other things, submitted as a voice search query, was submitted during the daytime on a weekday, and was submitted through a mobile device while the mobile device was undocked, all context which matches the context of the spoken query term 212. Additionally, as for the search query 520g, the search history 507 reflects that the user selected a search result associated with the search query 520h, which is a strong indication that the user was satisfied with the search query 520h.

The search results 520g and 520h may be included in the subset 523 for a variety of reasons, including the number of context matches, a percentage of context matches, the fact that the user selected an associated search result, or the fact that the search query passed a certain number of subset inclusion tests or passed certain subset inclusion tests. In general, a search query may be included in the subset 523 if the search query "sufficiently matches" the context of the spoken query term 212.

In general, any number of subset inclusion tests may be performed to determine whether a search query 520 "sufficiently matches" the context of the spoken query term 212. In some implementations, one inclusion test may be performed. For example, a search query 520 may be included in the subset 523 if at least a threshold percentage of context data matches the spoken query term 212 (e.g., the percentage may be 60%, meaning, in this example, that if ten context data items are stored for a particular search query 520 or for all search queries 520, that six of the context data items for the particular search query 520 need to match the context of the spoken query term 212 for the search query 520 to be included in the subset 523). As another example, a particular search query 520 may be included in the subset 523 if a threshold number (e.g., five) items of context data match the context of the spoken query term 212. A threshold number or percentage may be adjusted for a particular search query 520 based on the number of context items which may be applicable for that search query 520 (e.g., a threshold number may be lowered if more than a certain number (e.g., three) of context items are not applicable for a certain search query 520).

As yet another example, a subset inclusion test may involve testing to see if a particular context item for a search query 520 satisfies a particular condition. For example, a search query 520 may be included in the subset 523 if the device type used to submit the search query 520 matches the device type used to submit the spoken query term 212. In some implementations, a subset inclusion test may involve testing to see if the context item for a search query 520 satisfies a compound condition which may be expressed as a combination of two or more conditions expressed using Boolean operators. For example, a search query 520 may be included in the subset 523 if the device type used to submit the search query 520 matches the device type used to submit the spoken query term 212 and if the docking state of the two devices also match.

As another example, a search query 520 may be included in the subset 523 if the location where the search query 520 was submitted from matches the location where the spoken query term 212 was submitted from and if the time of day and type of day (e.g., weekday, weekend) of the submission of the search query 520 matches the time of day and type of day of the submission of the spoken query term 212. For instance, a user may live in one city (e.g., Newark) and may work in another city (e.g., New York) and therefore context of search queries 520 and time of day for particular types of search queries 520 may vary by location, depending on whether the user was at home or at work when submitting the search query 520). As yet another example, a search query 520 may be included in the subset 523 if the search query 520 was submitted as a voice query or if a search result associated with the search query 520 was selected.

Subset inclusion tests may be phrased either as conditions for inclusion in the subset 523 or as conditions for exclusion from the subset 523. For example, a search query 520 may be excluded from the subset 523 if the device type used to submit the search query 520 does not match the device type used to submit the spoken query term 212.

In some examples, one or more subset inclusion tests may be performed, where each test results in a score for each search query 520, and where the score represents a context similarity between the search query 520 and the spoken query term 212. If multiple subset inclusion tests are performed, a cumulative score may be calculated for each search query 520 as a sum of scores for each test. The subset 523 may be determined, for example, by selecting search queries 520 which have a score (or cumulative score) which is above a threshold. As another example, the subset 523 may be determined by selecting the search queries 520 having the P-best scores (or cumulative scores), where P is a positive number.

Various approaches may be used to select a value for P. For example, P may be selected as a percentage of the number of search queries 520 for which information is stored in the search history 507, where the percentage may vary based on the number of search queries 520 for which information is stored in the search history 507. For example, the larger the number of search queries 520 for which the search history 507 stores, the lower the percentage used for selecting P. As a specific example, if the search history 507 stores information for one hundred search queries 520, the value of P may be determined as twenty percent of one hundred, or twenty, and if the search history 507 stores information for one thousand search queries 520, the value of P may be determined as ten percent of one thousand, or one hundred. Other approaches may be used to select a value for P.

For some context data, a search query 520 either does or does not match the context of the spoken query term 212. For example, a search query 520 may either be issued as a voice query or not as a voice query. For other context data, a partial match or a measure of match may be determined. For example, a distance between the location associated with a search query 520 and a location associated with the spoken query term 212 may be determined. Subset inclusion tests may be based either on pass/fail types of tests or on tests which include a comparison to one or more measured values. For example, a first location may be considered as matching a second location if the distance between the locations is less than a threshold number of miles (e.g., ten). A strength of match for some context data may more strongly affect whether a search query 520 is included in the subset 523 than for other context data.

In some implementations, if context data is not available for a search query 520, the search query 520 is included in the subset 523. In some implementations, if context data is not available for a search query 520, the search query 520 is not included in the subset 523. The above examples for determining which search queries 520 to include in the subset 523 are meant to be illustrative, but other approaches may be used. In addition, some or all of the approaches discussed above may be used, in combinations which make sense for determining the subset 523.

After the subset 523 is determined, a frequency is determined for each n-gram, where the frequency indicates the number of times the n-gram is included in the query terms 521 associated with the search queries 520 of the subset 523.

As shown in table 510, the n-grams "Jim" 219*a*, "gem" 219*c*, "New York" 219*d*, "New" 219*f*, and "York" 219*g* do not appear at all in the query terms "gym Newark" 221*g* and "Newark Maps" 221*h* (where the query terms 521*g* and 521*h* are the query terms 521 associated with the search queries 520*g* and 120*h* included in the subset 523), so a value of zero is stored for respective frequencies 524*a*, 524*c*, 524*d*, 524*f*, and 524*g*. As another example, the n-gram "gym" 219*b* is included in the query terms "gym Newark" 521*g* and "Newark Maps" 521*h* a total of one time, so a frequency value of one is stored for the associated frequency 524*b*. As yet another example, the n-gram "Newark" 219*e* is included in the query terms "gym Newark" 521*g* and "Newark Maps" 521*h* a total of two times, so a frequency value of two is stored for the associated frequency 524*e*.

In one alternative implementation, the subset 523 is not selected in the same manner, but rather the frequency is obtained using a much larger subset, or all, of the search queries 520 in the search history 507. Specifically, a similarity metric is computed for each of the search queries 520 from the search history 507, and is used in addition to the frequencies 524 to compute the weighting for each n-gram. For example, rather than just selecting those search queries 520 which exactly match the context of the mobile device 201, a very large subset, or all, of the search queries 520 of the search history 507 is selected, thereby including the search queries 520 that do not match the context of the mobile device 201. A lower similarity or frequency score is assigned to those search queries 520 that do not exactly match the context of the mobile device 201. This allows for a 'shades-of-grey' approach to historical query similarity that is not afforded by selecting a binary subset, where each historical query is included or excluded in a black-or-white fashion.

During state (f'), weighting values 525 are determined for the n-grams 219 based on the associated frequencies 524. For example, the magnitude of a weighting value may correspond to the magnitude of the associated frequency, where a higher frequency results in a higher weighting value. For example, a weighting value 525*b* of one hundred percent is determined based on the associated frequency 524*b* of one and a weighting value 525*e* of two hundred percent is determined based on the associated frequency 524*e* of two. A weighting value 525 may correspond to the associated frequency 524 in a linear or non-linear fashion. If a frequency 524 is zero, a corresponding weighting value 525 may also be zero (e.g., as shown for weighting values 525*a*, 525*c*, 525*d*, 525*f*, and 525*g*). As another example, if a frequency value is zero, an associated weighting value 525 may be negative. A weighting value 525 may be expressed as a percentage or as a number representing a weighting factor.

The weighting values 525 are stored in association with the n-grams 219 and frequencies 524. The weighting values 525 that are associated with the n-grams 219 reflect the distribution of terms that are present in the user's search history 507. The weighting values 525 may be assigned by recompiling a language model finite state transducer for use by the speech recognition engine 202. The weighting values 525 may be smoothed so that n-grams 219 that do not exist in the search history 507 are still assigned a non-zero weighting value 525.

During state (g'), combined values 527 are determined for the candidate transcriptions 216 based on combining the speech recognition confidence values 217 for the candidate transcriptions 216 with the weighting values 525 for the n-grams 219 that are generated from the candidate transcriptions 216. In many respects, state (h) of FIG. 5 is similar to state (h) of FIG. 2.

In table 511, for the candidate transcription "Jim New York" 216*a*, the speech recognition confidence value 217*a* of "10" may be added to a first adjustment based on the n-gram "Jim" 219*a* and a second adjustment based on the n-gram "New York" 219*d*. The n-gram "Jim" 219*a* has an associated weighting 525*a* of 0%, so the first adjustment is "0". The n-gram "New York" 219*d* has an associated weighting 525*d* of 0%, so the second adjustment is also "0". The combined value 527*f* associated with the ranked candidate transcription 216*a* is, in this example, "10+0+0", or "10".

For the candidate transcription "gym New York" 216*b*, the speech recognition confidence value 217*b* of "10" may be added to a first adjustment based on the n-gram "gym" 219*b* and a second adjustment based on the n-gram "New York" 219*d*. The n-gram "gym" 219*b* has an associated weighting 525*b* of 100%, so the first adjustment is 100% of "10", or "10". The n-gram "New York" 219*d* has an associated weighting 525*d* of 0%, so the second adjustment is "0". The combined value 527*d* associated with the ranked candidate transcription 216*b* is, in this example, "10+10+0", or "20".

For the candidate transcription "gem New York" 216c, the speech recognition confidence value 217c of "9" may be added to a first adjustment based on the n-gram "gem" 219c and a second adjustment based on the n-gram "New York" 219d. The n-gram "gem" 219c has an associated weighting 525c of 0%, so the first adjustment is "0". The n-gram "New York" 219d has an associated weighting 525d of 0%, so the second adjustment is also "0". The combined value 527f associated with the ranked candidate transcription 126f is, in this example, "9+0+0", or "9".

For the candidate transcription "Jim Newark" 216d, the speech recognition confidence value 217d of "8" may be added to a first adjustment based on the n-gram "Jim" 219a and a second adjustment based on the n-gram "Newark" 219e. The n-gram "Jim" 219a has an associated weighting 525a of 0%, so the first adjustment is "0". The n-gram "Newark" 219e has an associated weighting 525e of 200%, so the second adjustment is 200% of "8", or "16". The combined value 527b associated with the ranked candidate transcription 126b is, in this example, "8+0+16", or "24".

For the candidate transcription "gym Newark" 216e, the speech recognition confidence value 217e of "8" may be added to a first adjustment based on the n-gram "gym" 219b and a second adjustment based on the n-gram "Newark" 219e. The n-gram "gym" 219b has an associated weighting 525b of 100%, so the first adjustment is 100% of "8", or "8". The n-gram "Newark" 219e has an associated weighting 525e of 200%, so the second adjustment is 200% of "8", or "16". The combined value 527a associated with the ranked candidate transcription 216e is, in this example, "8+8+16", or "32".

For the candidate transcription "gem Newark" 216f, the speech recognition confidence value 217f of "7" may be added to a first adjustment based on the n-gram "gem" 219c and a second adjustment based on the n-gram "Newark" 219e. The n-gram "gem" 219c has an associated weighting 525c of 0%, so the first adjustment is "0". The n-gram "Newark" 219e has an associated weighting 525e of 200%, so the second adjustment is 200% of "7", or "14". The combined value 527c associated with the ranked candidate transcription 216f is, in this example, "7+0+14", or "21".

Thus, the candidate transcription "gym Newark" 216e has the highest likelihood, with a combined value 527a of "32". Other approaches may be used to determine combined values 527. For example, naive Bayes or logistic regression, or some other linear or nonlinear probabilistic machine learning technique may be used.

States (h), (i), and (j) of FIG. 5 are similar, in many respects, to states (h), (i), and (j) of FIG. 2, respectively. During state (h), the search engine 204 selects one or more of the candidate transcriptions 216 as intended query terms. For example, the search engine 104 may select the candidate transcription that has the highest combined value score (e.g., "gym Newark" 216e).

During state (i), the search engine 204 implicitly executes a search query using the candidate transcription 216e, and produces search results 228. For example, a search query may be implicitly performed using the candidate term "gym Newark" 216e due to the associated combined value 527a exceeding a threshold (e.g., a threshold of thirty). State (i) of FIG. 5 is also similar, in many respects, to state (i) of FIG. 2. The search engine 104 generates HTML code 529, and communicates the code 529 over the network 205b to the client device 201. The search results 528 are responsive to the candidate transcription "gym Newark" 216e. During state (j), the client device 201 invokes the code 529, and displays the user interface 506.

The user may select a search result or, if the search performed is not the search the user intended, the user may select a control 530 if a suggested, second-choice alternate query (e.g., the candidate transcription 216d having the second-highest combined value 527b) is the search the user intended. The search history 507 may be updated, such as to record the performing of the search for the selected candidate transcription 216e, in association with the context data 215. As other examples of updating the search history 507, the selection of a search result 128 may be recorded, or the selection of the control 530 may be recorded. If the user is finished browsing the search results 528 and/or if the performed search and any suggested alternate candidate transcriptions are not acceptable, the user may speak a new search query term into a search control 532 to restart the process.

As another example, instead of a link for a single suggested alternate candidate transcription, the control 530 may be another type of control (e.g., a dropdown list) which allows the user to select a candidate transcription from a list of alternate, suggested candidate transcriptions. The control 530 may display some or all of the candidate transcriptions 216 (e.g., except for the candidate transcription selected during state (h)). If some but not all of the candidate transcriptions 216 are displayed in the control 530, the selection of which candidate transcriptions 216 to display may be based, for example, on associated combined values 527 exceeding a threshold, or on a Q-best list, where Q may be based on the size of the user interface 506. The value of Q may be based on the value of N previously discussed (e.g., N, as in the selection of N candidate transcriptions 216 having the N highest speech recognition confidence values during state (d)), or may be independent of the value of N.

In some implementations, a search query is performed using a candidate transcription selected from a list of suggested candidate transcriptions 216, when the user selects a control in the user interface 506. The list of suggested candidate transcriptions 216 may be ordered according to the combined values 527 (e.g., highest values first). In some implementations, the user may be able to speak a voice command to select a suggested candidate transcription, such as by speaking a number that corresponds to the rank of the candidate transcription, or by speaking another word that indicates which suggested candidate transcription to select from the list.

Figure 6:
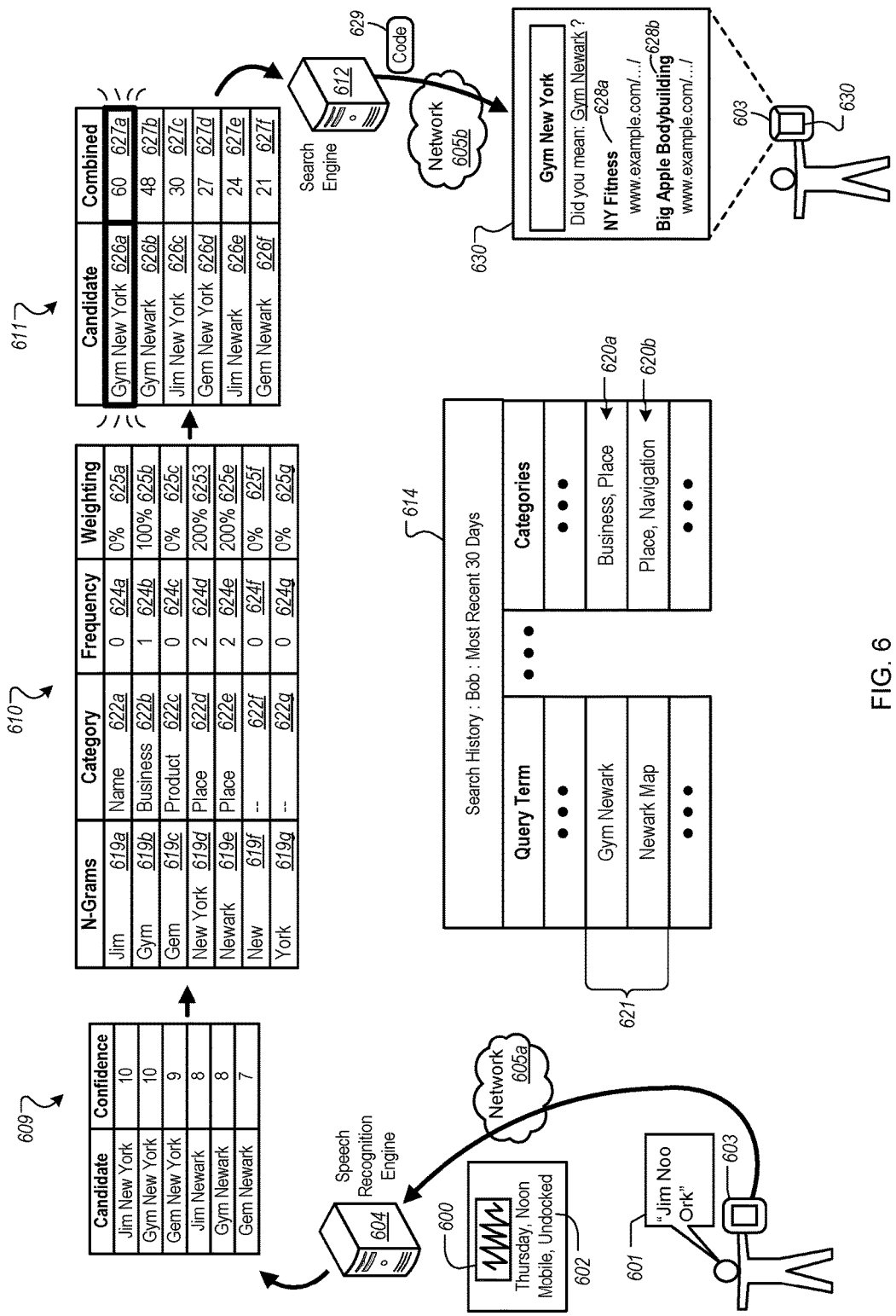

FIG. 6 illustrates an example system that may be used for disambiguating a spoken query term. Similar to the example shown in FIG. 5, an audio signal 600 representing a spoken query term 601 and context data 602 associated with the spoken query term 601 are transmitted from a client device 603 to a speech recognition engine 604, over network 605a. Also similar to FIG. 5, tables 609 to 611 illustrate data that is used by the speech recognition engine 604 and/or by a search engine 612 to disambiguate among several possible matches to the spoken query term 601 using a user search history 614. For example, n-grams 619 are generated from candidate transcriptions shown in the table 609.

However, rather than determining a frequency with which each n-gram 619 occurs in a subset of past search queries included in the user search history 614, a frequency may be determined based on a category match. For example, the user search history 614 may be categorized using a taxonomic classifier. For example, one or more categories may be associated with each past search query 620 included in the user search history 614. For instance, the search query 620a with a query term "gym Newark" may be assigned a first category of "business" and a second category of "place". As another example, the search query 620b with a query term "Newark map" may be assigned a first category of "place" and a second category of "navigation". Categories may be assigned, for example, by the search engine 612 or by another server (e.g., a category server). Categories may be stored in the user search history 614, as shown, or categories may be determined dynamically by processing the user search history 614.

One or more categories 622 may be determined for some or all n-grams 619. For example, zero or more categories may be determined for an n-gram using a category server or by referencing a category database. For example, a "name" category 622a has been determined for the "Jim" n-gram 619a, a "business" category 622b has been determined for the "gym" n-gram 619b, a "product" category 622c has been determined for the "gem" n-gram 619c, a "place" category 622d has been determined for the "New York" n-gram 619d, and a "place" category 622e has been determined for the "Newark" n-gram 619e. Some n-grams may not have a defined category. For example, it may be that no defined categories exist for the "new" n-gram 619f or the "York" n-gram 619g.

Frequencies 624 may be determined by determining a quantity of past search queries (e.g., either a quantity of the subset 621 of the past search queries or a quantity of all the search queries 620) that are equal to or associated with a category 622 associated with an associated n-gram 619. For example, no search queries 620 are associated with the "name" category associated with the "Jim" n-gram 619a, so the associated frequency 624a is assigned a value of "0". One search query 620 (e.g., search query 620a) is associated with the "business" category associated with the "gym" n-gram 619b, so the associated frequency 624b is assigned a value of "1". No search queries 620 are associated with the "product" category associated with the "gem" n-gram 619c, so the associated frequency 624c is assigned a value of "0". Two search queries 620 (e.g., the search queries 620a and 620b) are associated with the "place" category associated with the "New York" n-gram 619d, so the associated frequency 624d is assigned a value of "2". Similarly, two search queries 620 are associated with the "place" category associated with the "Newark" n-gram 619e, so the associated frequency 624e is assigned a value of two. Since no categories have been identified for the n-grams 619f and 619g, the respective frequencies 624f and 624g may be set to "0".

Weighting values 625 may be determined for each n-gram 619 based on associated frequencies 624. For example, as illustrated by frequencies 625a, 625c, 425f, and 425g, an associated frequency 624 of "0" may be mapped to a weighting value 625 of 0%. For non-zero frequencies 624, an associated weighting value 625 may be determined, where the magnitude of the weighting value reflects and is consistent with the associated frequency 624. For example, a weighting value 625b of 100% may be determined based on the respective frequency 624b, a weighting value 625d of 200% may be determined based on the respective frequency 624d, and a weighting value 625e of 200% may be determined based on the respective frequency 624e.

Combined values 627 may be determined by combining associated speech recognition confidence values with adjustments based on associated, respective weighting values 625. Candidate transcriptions 626 may be ranked, for example as shown in the table 611, according to highest combined value. The "gym New York" candidate transcription 626a may be, in this example, identified as a top candidate transcription. The top candidate transcription of "gym New York" 626a is a different result than the top candidate transcription "gym Newark" 126a determined in the example of FIG. 5, with the difference being due, at least in part, to the fact that in the example of FIG. 6, the candidate transcription "gym New York" received both a top speech recognition confidence value and a highest adjustment based on a categorical similarity to categories associated with the user search history 614. There are also other differences between the distribution of ranked candidate transcriptions 626 in the example of FIG. 6 and the distribution of ranked candidate transcriptions 216 in the example of FIG. 5.

After identifying the top candidate transcription 626a, the search engine 612 may implicitly perform a search query using the top candidate transcription 626a, may generate search results 628 responsive to the search query, and may generate code 629 for displaying a user interface 630 (e.g., a search results page) that includes the search results 628, and may communicates the code 629 over the network 605b to the client device 603. As another example, an m-best list of top candidate transcriptions 626 may be displayed in the user interface 630, allowing a user to select a candidate transcription 626 for a list of suggested candidate transcriptions.

In some implementations, other categorical approaches may be used. For example, a Dirichlet distribution may be generated and used to estimate the probability of a category being associated with the spoken query term 601 given prior information about a general likelihood of each category for all users, and using evidence of a category's inclusion in the user search history 614.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the invention have been described. Other embodiments are within the scope of the following claims. For example, the actions recited in the claims can be performed in a different order and still achieve desirable results.

What is claimed is:

1. A computer-implemented method for speech recognition comprising:

receiving, by a computing device, audio data that corresponds to a spoken utterance of a user;

generating, by the computing device, multiple candidate transcriptions of the spoken utterance, wherein one or more of the multiple candidate transcriptions include at least one term previously spoken by the user;

selecting, by the computing device and from among the multiple candidate transcriptions of the spoken utterance, a particular candidate transcription;

determining, by the computing device, that the particular candidate transcription includes a term that appears more than a predetermined number of times in transcriptions of utterances previously spoken by the user before speaking the spoken utterance; and based on determining that the particular candidate transcription includes a term that appears more than the predetermined number of times in the transcriptions of the utterances previously spoken by the user before speaking the spoken utterance, providing, for display on the computing device and as a speech recognition output, the particular candidate transcription as a transcription of the spoken utterance.

2. The method of claim 1, comprising:

in response to receiving the audio data that corresponds to the spoken utterance, determining context data that indicates a context of the computing device, wherein selecting the particular candidate transcription comprises selecting the particular candidate transcription based on the context data.

3. The method of claim 2, wherein the context data comprises:

a time and date when the computing device received the audio data that corresponds to the spoken utterance;

data that specifies a type of the computing device;

data that specifies a type of audio subsystem of the computing device;

data that specifies whether the computing device is plugged in;

data that specifies a location of the computing device where the computing device received the audio data that corresponds to the spoken utterance; and audio data that corresponds to ambient noise near the computing device.

4. The method of claim 2, wherein the context data comprises a time and date when the computing device received the audio data that corresponds to the spoken utterance.

5. The method of claim 2, wherein the context data comprises data that specifies a type of the computing device.

6. The method of claim 2, wherein the context data comprises data that specifies a type of audio subsystem of the computing device.

7. The method of claim 2, wherein the context data comprises data that specifies whether the computing device is plugged in.

8. The method of claim 2, wherein the context data comprises data that specifies a location of the computing device where the computing device received the audio data that corresponds to the spoken utterance.

9. The method of claim 2, wherein the context data comprises audio data that corresponds to ambient noise near the computing device.

10. The method of claim 1, comprising:

selecting, from among the multiple candidate transcriptions of the spoken utterance, an additional candidate transcription;

determining that the additional candidate transcription includes an additional term that appears, less than the predetermined number of times, in the transcriptions of utterances previously spoken by the user; and based on determining that the additional candidate transcription includes the additional term that appears, less than the predetermined number of times, in the transcriptions of utterances previously spoken by the user, providing, for display on the computing device, the additional transcription.

11. The method of claim 1, comprising:

selecting, from among the multiple candidate transcriptions of the spoken utterance, an additional transcription;

determining that the additional transcription includes the term that appears, more than the predetermined number of times, in the transcriptions of utterances previously spoken by the user; and based on determining that the additional transcription includes the term that appears, more than the predetermined number of times, in the transcriptions of utterances previously spoken by the user, providing, for display on the computing device, the additional transcription.

12. The method of claim 1, wherein providing, for display on the computing device, the particular candidate transcription comprises:

providing, for display on the computing device, search engine results based on the particular candidate transcription.

13. The method of claim 1, wherein the spoken utterance is a search query.

14. The method of claim 1, comprising:

determining, for each of the multiple candidate transcriptions of the spoken utterance, a confidence score that reflects a likelihood that the candidate transcription is an acoustic match for the spoken utterance, wherein selecting the particular transcription is based on the confidence scores of the multiple candidate transcriptions of the spoken utterance.

15. The method of claim 14, comprising:

determining a frequency that the term appears in each of the utterances previously spoken by the user before speaking the spoken utterance; and based on the frequency that the term appears in each of the utterances previously spoken by the user before speaking the spoken utterance, weighting, for each of the multiple candidate transcriptions, the confidence score, wherein providing the particular candidate transcription as the transcription of the spoken utterance is further based on the weighted confidence scores.

16. The method of claim 1, comprising:

determining, for each of the multiple candidate transcriptions of the spoken utterance and using an acoustic model, a confidence score that reflects a likelihood that the candidate transcription is an acoustic match for the spoken utterance; and bypassing providing, for output as a transcription of the spoken utterance, a candidate transcription that has a highest confidence score, wherein the computing device selects, from among the multiple candidate transcriptions of the spoken utterance, the particular candidate transcription after bypassing providing, for output as a transcription of the spoken utterance, the candidate transcription that has the highest confidence score.

17. The method of claim 16, wherein bypassing providing, for output as a transcription of the spoken utterance, a candidate transcription that has a highest confidence score comprises:

bypassing providing, for visual output as the transcription of the spoken utterance on a display of the computing device, the candidate transcription that has the highest confidence score, wherein the computing device selects, from among the multiple candidate transcriptions of the spoken utterance, the particular candidate transcription after bypassing providing, for visual output as a transcription of the spoken utterance, the candidate transcription that has the highest confidence score.

18. The method of claim 16, wherein bypassing providing, for output as a transcription of the spoken utterance, a candidate transcription that has a highest confidence score comprises:

bypassing providing, for audible output as the transcription of the spoken utterance through a speaker of the computing device, the candidate transcription that has the highest confidence score, wherein the computing device selects, from among the multiple candidate transcriptions of the spoken utterance, the particular candidate transcription after bypassing providing, for audible output as a transcription of the spoken utterance, the candidate transcription that has the highest confidence score.

19. The method of claim 1, comprising:

providing, by the computing device and to a server, a request for a number of times that the user has previously spoken each term, wherein the server includes a data storage device that stores transcriptions of utterances previously spoken by the user; and receiving, by the computing device and from the server, data identifying the number of times that the user has previously spoken each term, wherein determining, by the computing device, that the particular candidate transcription includes a term that appears more than a predetermined number of times in the transcriptions of the utterances previously spoken by the user before speaking the spoken utterance is based on the data identifying the number of times that the user has previously spoken each term.

20. A system comprising:

one or more computers and one or more storage devices storing instructions that are operable, when executed by the one or more computers, to cause the one or more computers to perform operations comprising:

receiving, by a computing device, audio data that corresponds to a spoken utterance of a user;

generating, by the computing device, multiple candidate transcriptions of the spoken utterance, wherein one or more of the multiple candidate transcriptions include at least one term previously spoken by the user;

selecting, by the computing device and from among the multiple candidate transcriptions of the spoken utterance, a particular candidate transcription;

determining, by the computing device, that the particular candidate transcription includes a term that appears more than a predetermined number of times in transcriptions of utterances previously spoken by the user before speaking the spoken utterance; and based on determining that the particular candidate transcription includes a term that appears more than the predetermined number of times in the transcriptions of the utterances previously spoken by the user before speaking the spoken utterance, providing, for display on the computing device and as a speech recognition output, the particular candidate transcription as a transcription of the spoken utterance.

21. The system of claim 20, wherein the operations further comprise:

in response to receiving the audio data that corresponds to the spoken utterance, determining context data that indicates a context of the computing device, wherein selecting the particular candidate transcription comprises selecting the particular candidate transcription based on the context data.

22. The system of claim 21, wherein the context data comprises:

a time and date when the computing device received the audio data that corresponds to the spoken utterance;

data that specifies a type of the computing device;

data that specifies a type of audio subsystem of the computing device;

data that specifies whether the computing device is plugged in;

data that specifies a location of the computing device where the computing device received the audio data that corresponds to the spoken utterance; and audio data that corresponds to ambient noise near the computing device.

23. The system of claim 20, wherein the operations further comprise:

selecting, from among the multiple candidate transcriptions of the spoken utterance, an additional candidate transcription;

determining that the additional candidate transcription includes an additional term that appears, less than the predetermined number of times, in the transcriptions of utterances previously spoken by the user; and based on determining that the additional candidate transcription includes the additional term that appears, less than the predetermined number of times, in the transcriptions of utterances previously spoken by the user, providing, for display on the computing device, the additional transcription.

24. A non-transitory computer-readable medium storing software comprising instructions executable by one or more computers which, upon such execution, cause the one or more computers to perform operations comprising:

receiving, by a computing device, audio data that corresponds to a spoken utterance of a user;

generating, by the computing device, multiple candidate transcriptions of the spoken utterance, wherein one or more of the multiple candidate transcriptions include at least one term previously spoken by the user;

selecting, by the computing device and from among the multiple candidate transcriptions of the spoken utterance, a particular candidate transcription;

determining, by the computing device, that the particular candidate transcription includes a term that appears more than a predetermined number of times in transcriptions of utterances previously spoken by the user before speaking the spoken utterance; and based on determining that the particular candidate transcription includes a term that appears more than the predetermined number of times in the transcriptions of the utterances previously spoken by the user before speaking the spoken utterance, providing, for display on the computing device and as a speech recognition output, the particular candidate transcription as a transcription of the spoken utterance.

* * * * *